(12) United States Patent
Roquemore, III et al.

(10) Patent No.: US 10,637,282 B2
(45) Date of Patent: Apr. 28, 2020

(54) LIGHT FIXTURE WITH POWER LOSS DETECTION AND EMERGENCY EGRESS MODE

(71) Applicant: ABL IP Holding LLC, Atlanta, GA (US)

(72) Inventors: John Peter Roquemore, III, Suwanee, GA (US); Charlie Huizenga, Berkeley, CA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/274,691

(22) Filed: Feb. 13, 2019

(65) Prior Publication Data

US 2019/0252911 A1 Aug. 15, 2019

Related U.S. Application Data

(60) Provisional application No. 62/629,791, filed on Feb. 13, 2018.

(51) Int. Cl.
| | | |
|---|---|---|
| *H05B 33/08* | (2020.01) | |
| *H02J 9/06* | (2006.01) | |
| *F21V 23/00* | (2015.01) | |
| *F21S 9/02* | (2006.01) | |
| *F21V 23/04* | (2006.01) | |
| *F21Y 115/10* | (2016.01) | |

(52) U.S. Cl.
CPC ............... *H02J 9/065* (2013.01); *F21S 9/022* (2013.01); *F21V 23/004* (2013.01); *F21V 23/0457* (2013.01); *H05B 33/0884* (2013.01); *F21Y 2115/10* (2016.08)

(58) Field of Classification Search
CPC ............ H05B 33/0845; H05B 33/0875; H05B 33/0878; H05B 33/0884
USPC ........................................... 315/86, 129, 307
See application file for complete search history.

(56) References Cited

U.S. PATENT DOCUMENTS

| | | |
|---|---|---|
| 7,400,226 B2 | 7/2008 | Barrieau et al. |
| 7,671,538 B2 | 3/2010 | Zilberberg |
| 7,737,640 B2 | 6/2010 | Marques et al. |
| 7,940,010 B2 * | 5/2011 | Patterson ................ G08B 7/066 315/129 |
| 7,999,666 B2 | 8/2011 | Barrieau et al. |
| 8,253,347 B2 | 8/2012 | Fiermuga |
| 8,279,574 B2 * | 10/2012 | Scoggins, Jr. ............ H02J 9/02 361/115 |
| 8,823,272 B2 | 9/2014 | Trainor et al. |

(Continued)

*Primary Examiner* — Tung X Le
(74) *Attorney, Agent, or Firm* — Kilpatrick Townsend & Stockton LLP (57) ABSTRACT

A light fixture includes a driver for driving a light engine based on control signals received from a controller coupled to the driver. The driver is further connected to an AC power source and is configured for detecting a power loss from the AC power source and generating a power loss signal. Upon detecting the power loss, the driver sends the power loss signal to the controller. Based on the power loss signal, the controller sends an emergency egress mode control signal to the driver which drives the light engine in the emergency egress mode, i.e. at its full intensity for an emergency time period. Upon expiration of the emergency time period or upon the recovery of the AC power, the controller exits the emergency egress mode by sending a normal control signal to the driver.

20 Claims, 4 Drawing Sheets

(56) References Cited

U.S. PATENT DOCUMENTS

| | | |
|---|---|---|
| 8,946,991 B2 | 2/2015 | Gordin |
| 9,066,393 B2 | 6/2015 | Recker et al. |
| 9,107,269 B2 | 8/2015 | Martin et al. |
| 9,214,834 B1 | 12/2015 | Lunn et al. |
| 9,247,625 B2 | 1/2016 | Recker et al. |
| 9,270,143 B1 | 2/2016 | Mangiaracina et al. |
| 9,560,703 B2 | 1/2017 | Trainor et al. |
| 9,609,706 B2 | 3/2017 | Crenshaw |
| 9,626,847 B2 | 4/2017 | Spiro |
| 9,627,927 B1 | 4/2017 | Rao |
| 9,721,404 B2 | 8/2017 | Muller |
| 9,835,691 B2 | 12/2017 | Trainor et al. |
| 9,871,404 B2 | 1/2018 | McBryde et al. |
| 2005/0200288 A1* | 9/2005 | Kuo ................. H02J 9/065 315/85 |
| 2013/0127362 A1* | 5/2013 | Trainor ............. H02J 9/065 315/224 |
| 2017/0093210 A1 | 3/2017 | Recker et al. |
| 2017/0148285 A1 | 5/2017 | Spiro |
| 2017/0171950 A1 | 6/2017 | Barna et al. |
| 2017/0271914 A1 | 9/2017 | Crenshaw |
| 2017/0290110 A1* | 10/2017 | Wilson ............. H02J 9/062 |

\* cited by examiner

LIGHT FIXTURE WITH POWER LOSS DETECTION AND EMERGENCY EGRESS MODE

CROSS REFERENCE TO RELATED APPLICATIONS

This application claims priority to U.S. Prov. App. No. 62/629,791, titled "Emergency Egress Mode and Driver with Power Loss Detection" and filed on Feb. 13, 2018, which is incorporated herein in its entirety.

TECHNICAL FIELD

The present disclosure relates generally to lighting systems and more specifically, but not by way of limitation, this disclosure relates to detecting power loss by a driver in a light fixture and switching the light fixture from a normal operation mode to an emergency egress mode upon detecting the power loss.

BACKGROUND

Emergency lighting is used for the path of egress illumination upon the loss of normal AC power. Some existing lighting systems use dedicated emergency lighting devices that switch or remain on when the lighting system of a building experiences a power outage. These lighting systems require emergency lighting devices in addition to the light fixtures used for normal illumination. Thus, the light fixtures used for normal illumination may not be fully utilized during a power outage.

Other lighting systems can utilize a single lighting fixture for both normal illumination and emergency illumination purposes thereby eliminating the need of a separate set of emergency lighting devices. However, the emergency operation of these light fixtures typically requires detection of normal AC power loss by a device that is powered by a separate emergency circuit, requiring additional high voltage wiring to the light fixtures.

SUMMARY

Certain embodiments involve a light fixture with a driver capable of detecting power loss that enters into an emergency egress mode upon detecting the power loss. The light fixture includes a driver connected to an AC power source and coupled to a light engine and a controller. The driver is configured for providing a DC power to a controller coupled to the driver, receiving control signals from the controller and driving the light engine according to the control signals. The driver is further configured for detecting a power loss from the AC power source and generating a power loss signal. The controller is configured for receiving the power loss signal from the driver, and in response to receiving the power loss signal, determining that the light fixture should enter an emergency egress mode. The controller then generates and sends an emergency egress mode control signal to the driver so that the driver can drive the light engine in the emergency egress mode. The controller further determines that the light fixture should exit the emergency egress mode when certain criteria are met and sends a normal control signal to the driver so that the driver drives the light engine in a normal state.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Certain aspects and features relate to a light fixture that is capable of detecting a power loss and entering an emergency egress mode upon detecting the power loss. The light fixture can include a light engine, a driver and a controller. The driver is powered by an AC power source during normal operation and provides DC power to the controller. The driver can control the light engine, such as turning on or off the light engine, controlling the intensity or color temperature of the light engine, based on control signals provided by the controller. The driver can detect power loss from the AC power source and generate and send a power loss signal to the controller. Based on the power loss signal, the controller can determine that the light fixture should enter an emergency egress mode. In the emergency egress mode, the controller can send an emergency egress mode control signal to the driver so that the driver can drive the light engine in according to an emergency egress mode configuration. In one example, the emergency egress mode configuration specifies full intensity for a predetermined time period. Upon expiration of the predetermined time period or upon detecting the power is restored, the controller can send normal control signals to the driver so that the light fixture can exit the emergency egress mode. The light fixtures described herein may comply with the UL 924 requirements for emergency lighting.

With the technologies described herein, a light fixture can be utilized as an emergency lighting device when there is a power loss, thereby providing a consistent way of lighting with the same light fixture. The driver of the light fixture is able to detect the power loss and thus no additional high voltage wiring to the light fixture for a power loss detection device is required, which significantly simplifies the wiring of the light fixture. Additionally, the technologies described herein allow a controller of the fixture to smoothly transition the light fixture from a normal operation state to an emergency egress mode and then from the emergency egress mode back to the normal operation state, improving the efficiency of the light fixtures. The transitions between the normal operation state and the emergency egress mode are smooth even though there may be a delay between the time that power is lost and that emergency power is provided by an emergency power source.

These illustrative examples are provided to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Figure 1:
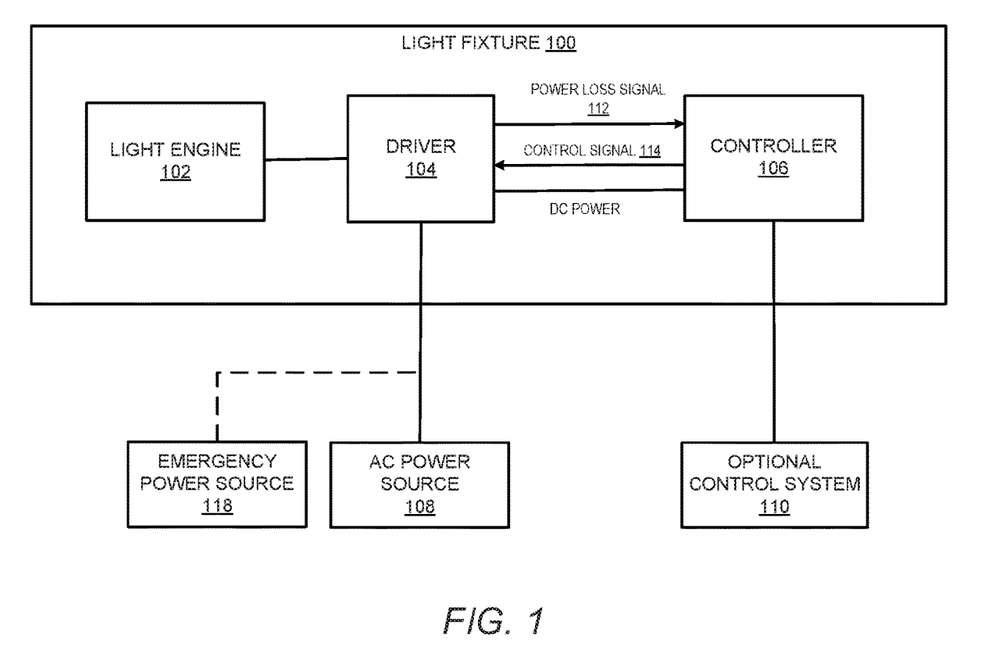
FIG. 1 is a block diagram of an example of a light fixture according to some aspects of the present disclosure.

FIG. 1 depicts an example of a light fixture 100. In this example, the light fixture 100 includes a light engine 102, a driver 104, and a controller 106. The driver 104 is connected to an AC power source 108. The driver 104 is also connected to the light engine 102 and drives the light engine 102. For example, the driver 104 can use power from the AC power source 108 to power and control the light engine 102 during normal operation. By regulating power provided to the light engine 102, the driver 104 can adjust the status of the light engine 102, such as controlling the on/off state, the intensity or the color temperature of the light engine 102. The driver 104 can adjust the power being provided to the light engine 102 based on instructions or control signals, for example, from the controller 106.

The light engine 102 can include any type of diode-based lighting sources including, but not limited to, LEDs OLEDs, qLEDs, SLEDs, laser diodes, etc. The light engine 102 can include one or more devices of various types. The light engine 102 can be modular and replaceable. The light sources, such as LEDs, may be arranged in series, in parallel, or any combination thereof and different types of LEDs or LEDs with different characteristics may be included in the same light fixture.

The driver 104 is also connected to the controller 106 and may provide DC power to the controller 106 via a DC power line. The driver 104 may communicate with the controller 106 via one or more signal lines. The driver 104 and the controller 106 may use a single bi-directional channel for communication or use one channel for communication from the driver 104 to the controller 106 and another channel for communication from the controller 106 to the driver 104. In some implementations, the controller 106 may use one or more control inputs of the driver 104 for communication from the controller 106 to the driver 104. The communications may be analog or digital.

In some implementations, the communication from the controller 106 to the driver 104 may include control signals 114 that are utilized by the driver 104 to control the light engine 102. The control signals 114 may specify whether the light engine 102 is on or off, the intensity level of the light engine 102, or other controllable characteristics of the light engine 102. Although FIG. 1 illustrates a single connection between the driver 104 and the light engine 102, the driver may provide multiple channels and different channels may be connected to different light source(s) within the light engine. As will be discussed in detail below, the control signal 114 may also include an emergency egress mode ("EEM") control signal when the light fixture 100 enters an emergency egress mode upon detecting a power loss from the AC power source 108. The EEM control signal may override the controls used prior to the power loss and instruct the driver 104 to drive the light engine to operate in an emergency egress mode configuration for a predetermined period of time. The control signals that are used to control the light engine 102 in absence of AC power loss are also referred to herein as "normal control signals." The control signals 114 may be transmitted using 0-10V voltage control, DMX, DALI, or any other suitable protocol.

The controller 140 can include one or more processors that execute computer-executable program code stored in a memory device, access information stored in the memory device, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, and network transmission, among others.

Examples of a processor include an application-specific integrated circuit, a field-programmable gate array, or any other suitable processing device. The processor can include any number of processing devices, including one. The processor can include or communicate with the memory device. The memory device can store program code that, when executed by the processor, causes the processor to perform the operations described in this disclosure.

The memory can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include Assembly language, C, C++, C #, Visual Basic, Java, Python, Perl, JavaScript, ActionScript, etc.

The controller 106 may also communicate with an optional control system 110 that includes control components including, but not limited to, sensors, actuators, or other controllers. For example, a control component can include a light controller that is operable by a user to turn on/off or dim the light fixture 100, an occupancy sensor detecting the presence of a person, or an ambient light sensor sensing an ambient light level. The controller 106 may also communicate with other controllers in other light fixtures, such as the light fixtures connected to the same AC power source as the light fixture 100. The communication can be conducted through wires connecting the multiple light fixtures or through wireless channels, such as Bluetooth, or Wi-Fi connections.

According to some aspects, the light fixture may be connected to an emergency power source 118, such as a generator or other backup systems, during loss of AC power. In such a scenario, the driver 104 may detect the loss of AC power from the AC power source 108 by monitoring its AC power input. The driver 104 may sense voltage levels or may use other ways to detect the loss of AC power. After a power loss, the driver may be able to operate for a short period of time before shutting down. During this short period of time, the driver 104 may be able to save certain state information, including information indicating that the driver 104 shut down due to a detected power loss, and to send a power loss signal 112 to the controller 106 indicating the detected loss of power.

Similarly, the controller 106 may also be able to operate for a short period of time after the power loss during which it may be able to save state information, receive the power loss signal 112 from the driver 104 and process the power loss signal 112. Upon receiving a power loss signal 112 from the driver 104, the controller 106 may determine whether the light fixture 100 should enter an emergency egress mode. If the AC power loss is more than a momentary loss, then the driver 104 and the controller 106 may shut down until the emergency power source 118 connected to the driver 104 begins providing backup power. There may be a delay between the time the AC power is lost and when the emergency power source 118 starts to provide backup power. In one example, the delay is approximately 2-8 seconds.

When the emergency power source 118 begins to provide backup power or emergency power, the controller 106 may turn back on and determine that the light fixture 100 should enter the emergency egress mode. The controller 106 may send an EEM control signal to the driver 104 instructing the driver 104 to drive the light engine 102 in an emergency egress mode according to the emergency egress mode configuration. In one example, the light engine 102 is on and at its full intensity in the emergency egress mode configuration. The emergency egress mode may override any settings that may have been used to drive the light engine 102 prior to the loss of power. For example, if the light engine 102 was off or dimmed prior to the loss of power, these settings are overridden by the EEM control signal in the emergency egress mode so that the light engine 102 is on and at full intensity when specified by the emergency egress mode configuration. In some implementations, the control signals sent from the controller 106 to the driver 104 instruct the driver 104 to drive the light engine 102 according to settings in the control signal, including the EEM control signal, until another control signal 114 is received. The EEM control signal may be sent to the driver 104 as a communication message or through one or more control inputs on the driver 104 to control the way the driver 104 drives the light engine 102.

If the power loss is momentary, e.g. a power glitch of 30-60 ms, it may be desirable to avoid entering the emergency egress mode. The controller 106 can determine that the power loss is momentary by delaying transmission of the EEM control signal to the driver 104. For example, after receiving the power loss signal 112, the controller 106 can wait for predetermined wait time, such as a time longer than 60 ms, before sending the EEM control signal to the driver 104 to drive the light engine 102 in the emergency egress mode configuration. If the controller 106 remains powered past the predetermined wait time, i.e. the controller 106 lost power but regained power before the expiration of the predetermined wait time, the controller 106 may determine that the power loss was momentary. As a result, the controller 106 may determine that the light fixture 100 should not enter the emergency egress mode. In another example, the controller 106 may also determine that the power loss is momentary by determining that the controller 106 remains powered and does not shut down after receiving the power loss signal 112 from the driver 104. In that case, the controller 106 may also determine not to enter the emergency egress mode. If the controller 106 determines that the power loss is not momentary, the controller 106 determines to enter the emergency egress mode and sends the EEM control signal to the driver 104 as described above. In another example, the driver 104 can be configured to determine whether the power loss is momentary by determining if the power loss is less than a threshold amount of time, for example, less than 150 milliseconds. The driver does not send the power loss signal if it detects that the power loss is momentary. In this example, the controller 106 can transmit the EEM control signal to the driver 104 whenever it receives the power loss signal from the driver 104.

Once the light fixture 100 enters the emergency egress mode, it may remain in emergency egress mode for a predetermined amount of time, referred to herein as the "emergency time period." In one implementation, the emergency time period is 90 minutes and is measured from the time that the power is restored, i.e., when the emergency power source 118 starts to provide power to the driver 104 or when the controller restarts after receiving a power loss signal and shutting down. At the end of the emergency time period, the controller 106 may exit the emergency egress mode and resume controlling the driver 104 according to a normal non-emergency mode, such as by sending a normal control signal 114.

In scenarios where the AC power is restored before the expiration of the predetermined time, it may be beneficial to exit the emergency egress mode prior to the expiration of the emergency time period to allow the light fixture 100 to return to normal operations. To detect whether the AC power is restored, the controller 106 may attempt to communicate with a controller associated with another light fixture that does not support emergency egress mode, i.e., a light fixture that is not designated as an emergency egress fixture during power loss. If the controller 106 successfully communicates with such a controller, then the controller 106 may determine that AC power has been restored and may exit emergency egress mode prior to the expiration of the emergency time period.

While in emergency egress mode, the controller 106 may provide an indication to an occupant in a building that the light fixture 100 is in the emergency egress mode. The indication may include illuminating or flashing an LED indicator of the light fixture 100 (not shown in FIG. 1). The indication can also include blinking or dimming the light engine 102 when an occupant attempts to control the light engine 102 through the optional control system 110 such as a light switch while the light fixture 100 is in the emergency egress mode. Such an indication may help an occupant identify a light fixture that detected a power loss and entered the emergency egress mode, especially in scenarios where the AC power is quickly restored, but the light fixture 100 is still in the emergency egress mode. The controller 106 may ignore any inputs or messages from other controllers or interfaces during the emergency egress mode.

It should be understood that the number, type, and arrangement of devices depicted in FIG. 1 are provided for illustrative purposes. Additional and/or different devices may be used. Further, although FIG. 1 illustrates that the driver 104 and the controller 106 are separate components within a light fixture 100, in other implementations, the driver 104 and the controller 106 are combined into a single component of the light fixture 100. In addition, while not shown in FIG. 1, the light fixture 100 may be a part of a lighting network that including multiple light fixtures. The multiple light fixtures might be connected to the same AC power circuit, and some, but not all of the light fixtures may be configured to provide the emergency egress mode capability described above. The light fixtures that do not provide emergency egress mode power down when the AC power is lost. In some instances, the drivers of these light fixtures may have the power loss detection capability, i.e. detecting the AC power loss and sending a power loss message to the respective controllers to indicate the power loss, but the controllers do not handle the power loss messages as described above.

In some implementations, upon installation or assembly of the light fixture 100, the controller 106 may be further configured to detect whether the controller 106 is connected to a suitable driver that provides proper DC power, detects power loss and generates a power loss signal as described above. If the controller 106 determines that it is not connected to a suitable driver, the controller 106 may generate an output to alert an installer. For example, if the controller 106 does not receive a positive response from the driver that the driver can detect the power loss, the controller 106 may control the driver 104 so that the light engine 102 is unusable, such as the light engine cannot be turned on or the light engine 102 continuously blinks. This prevents the controller 106 from being installed without being paired with a proper driver and also prevents a failed driver from being replaced with an incorrect driver.

Figure 2:
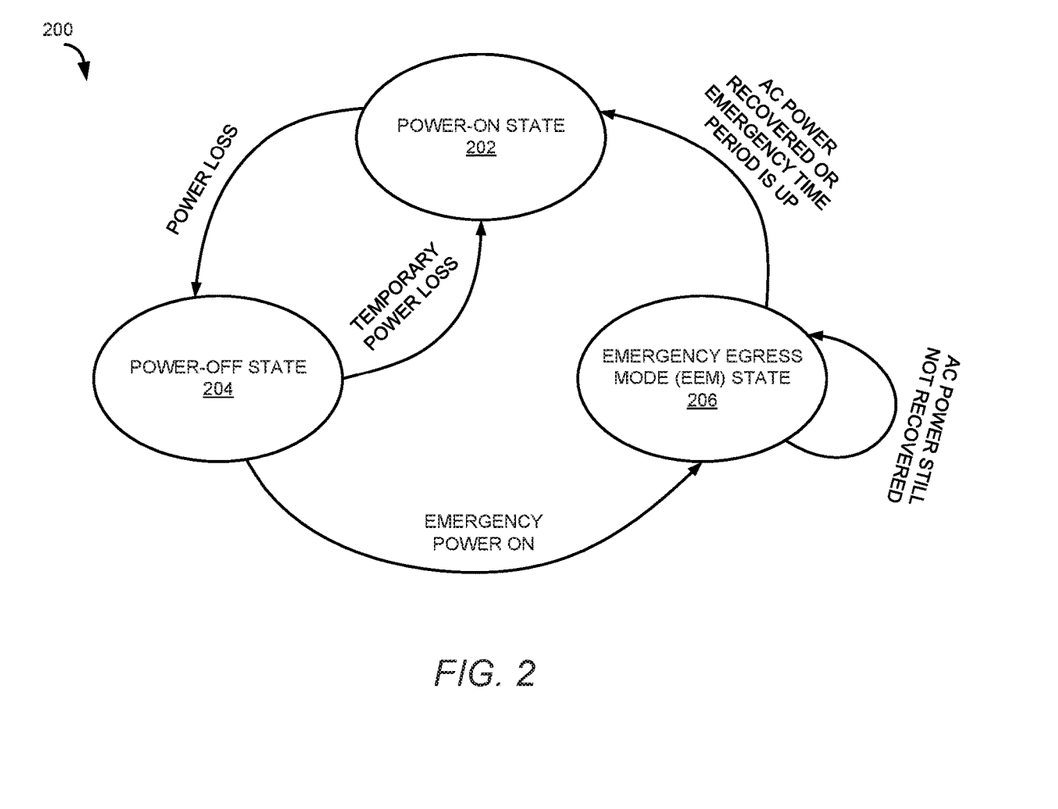
FIG. 2 is an example of a state transition diagram for the light fixture according to some aspects of the present disclosure.

FIG. 2 depicts an example of a state transition diagram 200 for the light fixture 100 according to some aspects of the present disclosure. As shown in FIG. 2, the light fixture 100 may operate in one of three states: power-on state 202, power-off state 204 and the emergency egress mode ("EEM") state 206. If the AC power source 108 provides AC power to the driver 104 normally, the light fixture 100 operates in the power-on state 202. In the power-on state 202, the driver 104 drives the light engine 102 based on the control signals 114 received from the controller 106, such as to control the on or off state of the light engine 102, to control the intensity, the color temperature, or other characteristics of the light engine 102.

If there is a power loss from the AC power source 108, the driver 104 can detect the power loss and the light fixture 100 enters the power-off state 204. In the power-off state 204, the driver 104 stores its status information, generates and sends a power loss signal 112 to the controller 106 and shuts down. Likewise, the controller 106 receives the power loss signal 112 from the driver 104, stores its status information and shuts down in the power-off state 204. If, during the power-off state 204, the controller 106 regains power within a short period of time and does not shut down, the controller 106 may determine that the power loss is momentary, and that the light fixture 100 should not enter emergency egress mode. In such a situation, the light fixture 100 returns to the power-on state 202 to resume its normal operation as described above. In another example, the controller is always powered, for example, through an external power source such as a battery or another emergency power source. In this example, the controller does not power down and enters the EEM state upon receiving the power loss signal.

If the controller 106 determines that the power loss is more than momentary, the controller 106 may determine that the light fixture 100 enters the EEM state 206 in which the light fixture 100 operates in the emergency egress mode. In this state, the controller 106 may send an EEM control signal to the driver 104 so that the driver 104 can drive the light engine 102 to be on and at its full intensity for an emergency time period. While in the EEM state 206, the controller 106 may determine whether the AC power from the AC power source 108 has been recovered, for example, by communicating with another controller that does not support the emergency egress mode. If the communication to the other controller is unsuccessful, the controller 106 may determine that the AC power has not been recovered, and that the light fixture 100 should remain in the EEM state 206. If the communication is successful, the controller 106 may determine that the AC power has been recovered.

Upon determining that the AC power has been recovered or that the emergency time period is up, the light fixture 100 may exit the EEM state 206 and return to power-on state 202 to operate as normal. To achieve the transition, the controller 106 may send normal control signals 114 to the driver 104 so that the driver 104 can drive the light engine 102 as normal based on the settings of the light fixture 100, such as the on/off settings, the intensity settings, and the color temperature settings of the light sources.

Figure 3A:
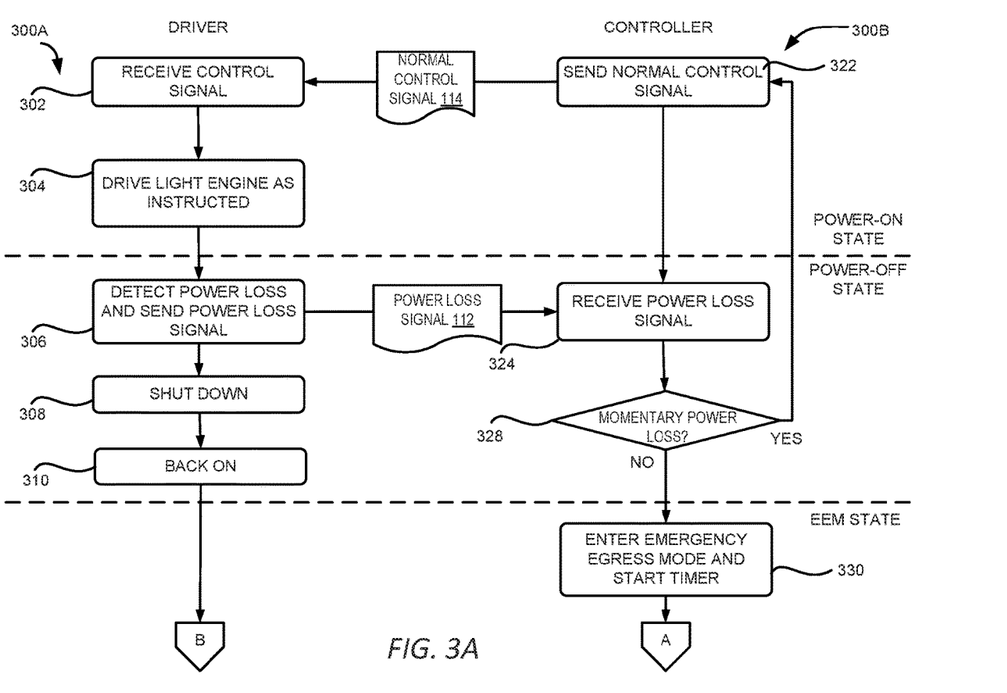
FIGS. 3A and 3B depict a flow chart of an example of a process for a light fixture to enter into emergency egress mode upon detection of power loss according to some aspects of the present disclosure.
Figure 3B:
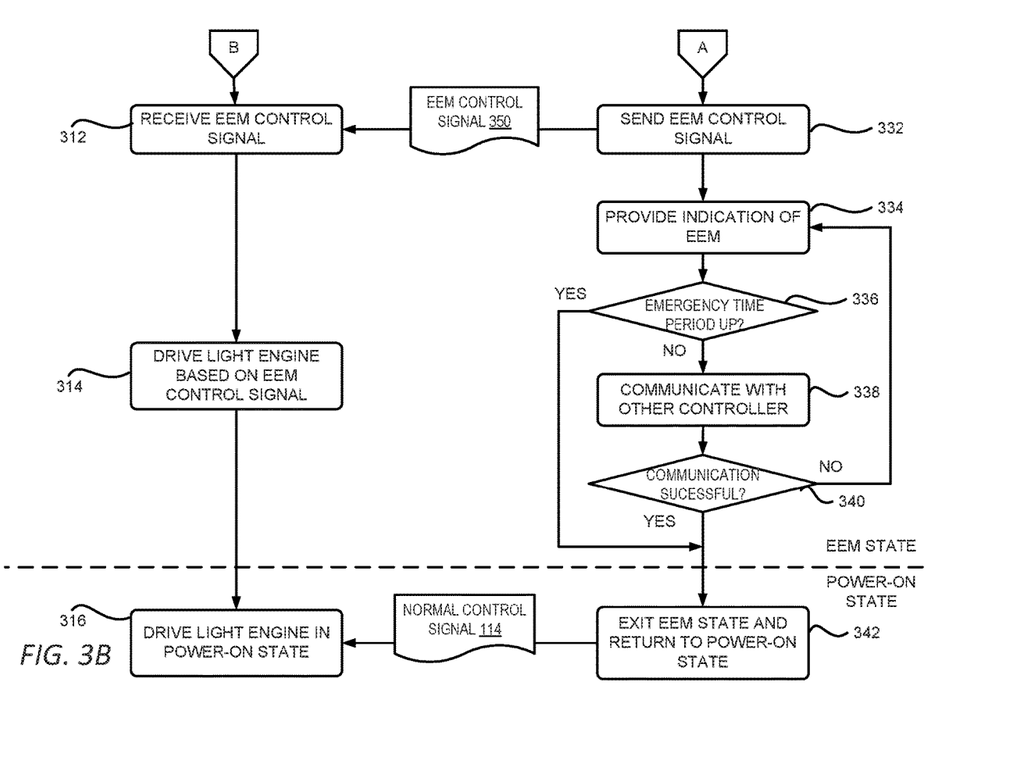

FIGS. 3A and 3B depict a flow chart of an example of a process for a light fixture to enter into emergency egress mode upon detection of power loss according to some aspects of the present disclosure. In particular, the process 300A illustrates aspects of the driver 104 and the process 300B illustrates aspects of the controller 106 with respect to the disclosure presented above regarding FIGS. 1 and 2. The processes 300A and 300B will be described together below.

In block 322, the process 300B involves generating and sending a normal control signal 114 by the controller 106 to the driver 104. The controller 106 can generate the control signal 114 based on a control program executing in the controller 106. Alternatively, or additionally, the controller 106 can generate the control signal 114 based on an external control signal received from the optional control system 110, such as a switch operated by an occupant or a sensor installed in the building. In block 302, the processing 300A involves receiving the control signal 114 by the driver 104 from the controller 106. In block 304, the driver 104 drives the light engine 102 as instructed in the control signal 114. For example, the driver 104 can drive the light engine 102 at a certain intensity level specified in the control signal 114. In these blocks, the light fixture 100 operates in the power-on state.

If the light fixture 100 losses the AC power from the AC power source 108, the light fixture 100 enters into a power-off state. In block 306, the driver 104 detects the power loss and send a power loss signal 112 to the controller 106. In block 308, the driver 104 performs a shutdown procedure, such as saving status information and powering off. When the emergency power is supplied to the driver 104, the driver 104 is back on in block 310.

In block 324, the controller 106 receives the power loss signal 112. In block 328, the controller 106 determines that if the power loss is momentary. If so, the controller 106 does not process the power loss signal and instead sends control signals 114 as normal. The controller 106 can determine whether the power loss is momentary by waiting for a predetermined wait time. At the end of the predetermined wait time, if the controller 106 has stored its status information, shut down and then backed up, but is still powered, the controller 106 can determine that the power loss is momentary. On the other hand, if the controller 106 is not powered after the predetermined amount of time, once the controller regains power the controller 106 can determine that the power loss was not momentary. In addition, if the controller 106 does not lose the power after receiving the power loss signal 112, the controller 106 can also determine that the power loss is momentary and return to the power-on state to operate as normal.

If the power loss is not momentary, in block 330, the controller 106 enters the emergency egress mode and thus the light fixture 100 enters the EEM state. In another example, the controller 106 does not determine whether the power loss is momentary and thus skips block 328. In this example, the controller 106 is always powered and the driver 104 is configured to detect if the power loss is momentary. For example, the driver can determine that the power loss is not momentary if the power loss lasts more than a predetermined period of time, such as 15 milliseconds. If the driver determines that power loss is not momentary, the driver sends a power loss signal to the controller. Upon receiving the power loss signal, the controller and thus the light fixture enters the emergency egress mode in block 330.

In block 332, the controller 106 sends an EEM control signal 350 to the driver 104. The EEM control signal 350 may instruct that the light engine 102 should remain on at full intensity for the entire emergency time period. In block 312, the driver 104 receives the EEM control signal 350, and in block 314, the driver 104 drives the light engine 102 according to the EEM control signal 350.

While in the EEM mode, in block 334, the controller 106 provides an indication that the light fixture 100 is in the emergency egress mode. For example, the controller 106 can illuminate or flash an LED indicator of the light fixture 100. The controller 106 can also blink or dim the light engine 102 when an occupant attempts to control the light engine 102 through the optional control system 110 while the light fixture 100 is in the emergency egress mode.

In block 336, the controller 106 determines if the emergency time period is ended. If so, the controller 106 exits the EEM state and returns to the power-on state in block 342. If the emergency time period has not ended, the controller 106 can still determine if the light fixture 100 should exit the emergency egress mode. In block 338, the controller 106 communicates with the controller of another light fixture powered by the same AC power source but does not support emergency egress mode. In block 340, the controller 106 determines if the communication is successful, such as receiving a response from the controller of the other light fixture. If not, the controller 106 remains in the EEM state. If the communication is successful, the controller 106 can determine that the AC power has been restored, and exit the EEM state and return to the power-on state in block 342, where the controller 106 sends normal control signals 114 to the driver 104. In block 316, the driver 104 drives the light engine 102 in the power-on state based on the normal control signal 114.

The foregoing description of the examples, including illustrated examples, has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. A light fixture, comprising:
   a driver connected to an AC power source and coupled to a light engine and a controller, the driver configured for:
   providing a DC power to the controller;
   receiving control signals from the controller and driving the light engine according to the control signals;
   detecting a power loss from the AC power source and generating a power loss signal; and
   the controller coupled to the driver, the controller configured for:
   receiving the power loss signal from the driver;
   generating and sending an emergency egress mode control signal to the driver so that the driver drives the light engine in an emergency egress mode;
   determining whether to exit the emergency egress mode; and
   when the determination is to exit the emergency egress mode, sending a normal control signal to the driver so that the driver drives the light engine in a normal state.

2. The light fixture of claim 1, wherein the driver is further configured for:
   determining that the power loss is momentary; and
   in response to determining that the power loss is not momentary, generating and sending the power loss signal to the controller.

3. The light fixture of claim 1, wherein determining whether to exit the emergency egress mode comprises:
   determining that the light fixture has been in the emergency egress mode for an emergency time period; and
   in response to determining that the light fixture has been in the emergency egress mode for the emergency time period, determining that the light fixture is to exit the emergency egress mode.

4. The light fixture of claim 1, wherein determining whether to exit the emergency egress mode comprises:
   communicating with another light fixture not supporting the emergency egress mode;
   determining that a response has been received from the other light fixture; and
   in response to determining that a response has been received from the other light fixture, determining that the light fixture is to exit the emergency egress mode.

5. The light fixture of claim 1, wherein the controller is further configured for:
   receiving an external control signal for controlling the light fixture in the emergency egress mode;
   ignoring the external control signal for controlling the light fixture; and
   causing an indication to be generated to indicate that the light fixture is in the emergency egress mode.

6. The light fixture of claim 1, wherein the controller overrides settings of the light engine prior to the power loss by sending the emergency egress mode control signal to the driver.

7. The light fixture of claim 6, wherein the emergency egress mode control signal comprises an instruction to drive the light engine at full intensity.

8. The light fixture of claim 1, wherein the controller is further configured for:
   detecting that the driver is not configured for detecting a power loss and generating a power loss signal; and
   in response to detecting that the driver is not configured for detecting a power loss and generating a power loss signal, causing the light fixture to be unusable.

9. The light fixture of claim 1, wherein causing the light fixture to be unusable comprises preventing the light engine from being turned on or causing the light engine continuously blink.

10. A method comprising:
    detecting, by a driver of a light fixture, a power loss from an AC power source connected to the driver, the driver configured to drive a light engine of the light fixture;
    generating and sending, by the driver, a power loss signal to a controller of the light fixture that is coupled to the driver;
    receiving, by the controller, the power loss signal from the driver;

in response to receiving the power loss signal, sending, by the controller, an emergency egress mode control signal to the driver so that the driver drives the light engine in an emergency egress mode;

determining, by the controller, whether to exit the emergency egress mode; and when the determination is to exit the emergency egress mode, sending, by the controller, a normal control signal to the driver so that the driver drives the light engine in a power-on state.

11. The method of claim 10, wherein determining that the light fixture should exit the emergency egress mode comprises:

determining that the light fixture has been in the emergency egress mode for an emergency time period; and in response to determining that the light fixture has been in the emergency egress mode for the emergency time period, determining that the light fixture is to exit the emergency egress mode.

12. The method of claim 10, wherein determining that the light fixture should exit the emergency egress mode comprises:

communicating with another light fixture not supporting the emergency egress mode;

determining that the communication is successful; and in response to determining that the communication is successful, determining that the light fixture is to exit the emergency egress mode.

13. The method of claim 10, wherein the emergency egress mode control signal comprises an instruction to drive the light engine at full intensity.

14. The method of claim 10, further comprising:

detecting that the driver is not configured for detecting a power loss and generating a power loss signal; and in response to detecting that the driver is not configured for detecting a power loss and generating a power loss signal, causing the light fixture to be unusable.

15. A method comprising:

receiving, by a controller of a light fixture, a power loss signal from a driver of the light fixture that is coupled to the controller indicating a power loss from an AC power source connected to the driver, the driver configured to drive a light engine of the light fixture;

in response to receiving the power loss signal, determining, by the controller, whether to enter an emergency egress mode;

when the determination is to enter the emergency egress mode, generating and sending, by the controller, an emergency egress mode control signal to the driver so that the driver drives the light engine in the emergency egress mode;

determining, by the controller, whether to exit the emergency egress mode; and when the determination is to exit the emergency egress mode, sending, by the controller, a normal control signal to the driver so that the driver drives the light engine in a power-on state.

16. The method of claim 15, wherein determining whether to enter an emergency egress mode comprises:

in response to receiving the power loss signal, waiting for a predetermined period of time;

determining that the controller was not powered upon expiration of the predetermined period of time; and in response to determining that the controller was not powered upon expiration of the predetermined period of time, determining that the light fixture is to enter the emergency egress mode.

17. The method of claim 15, wherein determining whether to exit the emergency egress mode comprises:

determining that the light fixture has been in the emergency egress mode for an emergency time period; and in response to determining that the light fixture has been in the emergency egress mode for the emergency time period, determining that the light fixture is to exit the emergency egress mode.

18. The method of claim 15, wherein determining whether to exit the emergency egress mode comprises:

communicating with another light fixture not supporting the emergency egress mode;

determining that the communication is successful; and in response to determining that the communication is successful, determining that the light fixture is to exit the emergency egress mode.

19. The method of claim 15, further comprising:

receiving an external control signal for controlling the light fixture in the emergency egress mode;

ignoring the external control signal for controlling the light fixture; and causing an indication to be generated to indicate that the light fixture is in the emergency egress mode.

20. The method of claim 15, further comprising:

detecting that the driver is not configured for detecting a power loss and generating a power loss signal; and in response to detecting that the driver is not configured for detecting a power loss and generating a power loss signal, causing the light fixture to be unusable.

* * * * *